United States Patent
Tang (10) Patent No.: US 9,162,331 B2
(45) Date of Patent: Oct. 20, 2015

(54) ELECTRIC TOOL AND CONTROLLING METHOD THEREOF

(75) Inventor: Xiangyang Tang, Jiangsu (CN)

(73) Assignee: POSITEC POWER TOOLS (SUZHOU) CO. LTD., Suzhou, Jiangsu (CN)

( * ) Notice: Subject to any disclaimer, the term of this patent is extended or adjusted under 35 U.S.C. 154(b) by 682 days.

(21) Appl. No.: 13/143,325

(22) PCT Filed: Jan. 4, 2010

(86) PCT No.: PCT/CN2010/070014
§ 371 (c)(1),
(2), (4) Date: Aug. 31, 2011

(87) PCT Pub. No.: WO2010/075820
PCT Pub. Date: Jul. 8, 2010

(65) Prior Publication Data
US 2011/0303427 A1    Dec. 15, 2011

(30) Foreign Application Priority Data
Jan. 4, 2009    (CN) .......................... 2009 1 0001862

(51) Int. Cl.
*B25B 23/00* (2006.01)
*B23Q 5/06* (2006.01)
(Continued)

(52) U.S. Cl.
CPC .............. *B23P 19/066* (2013.01); *B25B 23/14* (2013.01); *B25B 23/147* (2013.01); *G05D 17/02* (2013.01); *H02P 3/08* (2013.01); *H02P 7/285* (2013.01); *H02P 7/29* (2013.01); *H02P 29/02* (2013.01)

(58) Field of Classification Search
USPC ................................... 173/1, 2, 176; 318/474
See application file for complete search history.

(56) References Cited

U.S. PATENT DOCUMENTS 3,845,373 A * 10/1974 Totsu et al. .................... 318/434
3,962,619 A *  6/1976 Nishimura et al. ........... 318/571
(Continued)

FOREIGN PATENT DOCUMENTS

| CN | 1105614 A | 7/1995 |
| CN | 2762964 Y | 3/2006 |

(Continued)

OTHER PUBLICATIONS

International Search Report mailed Apr. 15, 2010 in PCT/CN2010/070014, 6 pages.
(Continued)

*Primary Examiner* — Nathaniel Chukwurah
(74) *Attorney, Agent, or Firm* — Howard & Howard Attorneys PLLC (57) ABSTRACT

A power tool including a motor for rotatably driving a tool bit at an attained rotational speed, a source for supplying an electric current to the motor, a sensor for measuring the current, and a control device. The control component fulfills the task of detecting a variation of the slope of the current in the course of time, and generates a control signal. The rotational speed of the tool is reduced in response to the control signal. The power tool automatically detects whether the work piece operated by the tool bit reaches a predetermined position by electronic control means. It may make sure that the screw is driven into a piece of wood and does not go beyond the predetermined position once it detects that the work piece reaches the position and carries out a changing action.

16 Claims, 9 Drawing Sheets

(51) Int. Cl.
*B23P 19/06* (2006.01)
*B25B 23/14* (2006.01)
*B25B 23/147* (2006.01)
*G05D 17/02* (2006.01)
*H02P 3/08* (2006.01)
*H02P 7/285* (2006.01)
*H02P 7/29* (2006.01)
*H02P 29/02* (2006.01)

(56) References Cited

U.S. PATENT DOCUMENTS

| | | | |
|---|---|---|---|
| 4,013,895 A | | 3/1977 | Akiyoshi et al. |
| 4,249,117 A | * | 2/1981 | Leukhardt et al. ............ 318/275 |
| 4,386,305 A | | 5/1983 | Kohzai et al. |
| 5,410,229 A | | 4/1995 | Sebastian et al. |
| 5,563,482 A | | 10/1996 | Shaw et al. |
| 5,650,574 A | | 7/1997 | Sato et al. |
| 6,344,724 B1 | * | 2/2002 | Kakino et al. ................ 318/569 |
| 6,479,958 B1 | * | 11/2002 | Thompson et al. ........... 318/430 |
| 7,091,683 B1 | | 8/2006 | Smith et al. |
| 7,243,734 B2 | | 7/2007 | Wu |
| 7,410,006 B2 | | 8/2008 | Zhang et al. |
| 2006/0152179 A1 | | 7/2006 | Chang |
| 2006/0185869 A1 | | 8/2006 | Arimura |
| 2006/0201688 A1 | * | 9/2006 | Jenner et al. .................... 173/48 |
| 2010/0089600 A1 | * | 4/2010 | Borinato et al. .................. 173/1 |

FOREIGN PATENT DOCUMENTS

| | | | |
|---|---|---|---|
| CN | 1824464 A | | 8/2006 |
| CN | 0962199 A | | 5/2007 |
| CN | 101247100 A | | 8/2009 |
| CN | 101499763 A | | 8/2009 |
| CN | 201405095 Y | | 2/2010 |
| CN | 201405335 Y | | 2/2010 |
| DE | 19620782 A1 | | 12/1996 |
| EP | 0087373 A1 | | 8/1983 |
| EP | 0187353 A2 | | 7/1986 |
| EP | 0264034 A2 | | 4/1988 |
| EP | 0264698 A2 | | 4/1988 |
| EP | 0285815 A1 | | 10/1988 |
| EP | 2128734 A1 | * | 12/2009 |
| JP | 5689485 A | | 7/1981 |
| JP | 57114373 A | | 7/1982 |
| JP | 3032531 A | | 2/1991 |
| JP | 08141928 A | | 4/1996 |
| JP | 2013176840 A | | 9/2013 |
| TW | 1297299 B | | 6/2008 |
| WO | WO02098612 A1 | | 12/2002 |
| WO | WO 03090974 A1 | | 11/2003 |
| WO | WO 2008101408 A1 | * | 8/2008 |

OTHER PUBLICATIONS

English language abstract and machine assisted translation for DE 19620782 extracted from espacenet.com database on Nov. 15, 2013, 16 pages.

English language abstract and machine assisted translation for EP 0087373 extracted from espacenet.com database on Nov. 14, 2013, 29 pages.

English language abstract and machine assisted translation for EP 0264034 extracted from espacenet.com database on Nov. 14, 2013, 21 pages.

English language abstract and machine assisted translation for EP 0264698 extracted from espacenet.com database on Nov. 14, 2013, 16 pages.

English language abstract and machine assisted translation for EP 0285815 extracted from espacenet.com database on Nov. 14, 2013, 24 pages.

Supplementary European Search Report for Application No. EP 10726786 dated Sep. 25, 2013, 3 pages.

English language abstract and machine-assisted translation for EP0187353 extracted from the espacenet.com database on Jun. 30, 2014, 10 pages.

English language translation for JP56-89485, obtained from the Official Gazette for Kokai Patent Application, 4 pages.

English language abstract and machine-assisted translation for JP08141928 extracted from the PAJ database on Jun. 30, 2014, 14 pages.

U.S. Appl. No. 12/527,018, filed Nov. 16, 2009, which is the National Phase Application of WO2008/101408.

* cited by examiner

| Data | | The second derivative used for judgment | | The product of the second derivative and the first derivative used for judgment | |
|---|---|---|---|---|---|
| Detected parameters | Initially delay time | 800ms | | 250ms | 380ms |
| | Sampling time | High Speed | Low Speed | High Speed | Low Speed |
| Spruce(CN) | Dia 4x50 | 90.00% | 70% | 90% | 100% |
| | Dia 5x50 | 70.00% | 100% | 100% | 100% |
| | Dia 5x60 | 70.00% | 100% | 100% | 100% |
| Spruce(US)+Larch | Dia 4x50 | 90.00% | 77.80% | 100% | 90% |
| | Dia 5x50 | 62.50% | 100% | 100% | 100% |
| | Dia 5x60 | 77.80% | 75% | 75% | 100% |
| Spruce+Larch(CN) | Dia 4x50 | 88% | 50% | 100% | 50% |
| | Dia 5x50 | 100% | 100% | 100% | 100% |
| | Dia 5x60 | 75% | 87.50% | 100% | 100% |
| Larch+Spruce(CN) | Dia 4x50 | 100% | 100% | 100% | 100% |
| | Dia 5x50 | 100% | 100% | 100% | 100% |
| | Dia 5x60 | 100% | 100% | 100% | 100% |
| Larch(US)+Spruce | Dia 4x50 | 100% | 100% | 100% | 100% |
| | Dia 5x50 | 100% | 87.50% | 88% | 100% |
| | Dia 5x60 | 100% | 66.70% | 33.30% | 100% |
| Larch(CN) | Dia 4x50 | 88% | 87.50% | 100% | 100% |
| | Dia 5x50 | 100% | 90% | 100% | 100% |

ELECTRIC TOOL AND CONTROLLING METHOD THEREOF

CROSS-REFERENCES TO RELATED APPLICATIONS

The instant application claims priority to and all the benefits of International Application No. PCT/CN2010/070014 filed Jan. 4, 2010, with the World Intellectual Property Organization, and which claims priority to Chinese Application No. CN200910001862.5 filed Jan. 4, 2009.

BACKGROUND OF THE INVENTION

1. Field of the Invention

The invention relates to an electric tool, preferably an electric screw driver, and a controlling method of the electric tool.

2. Description of the Related Art

In the present power tools, such as electric screw drivers, which is driven by a rotary motor and screw into a board of wood via supplying current from a loaded power. The screws may have different diameters. And the shapes of the heads of different screws are different from each other. Thus different circumstance will occur when different screws are driven into the same board of wood. Additionally, if the same screw is driven into different material, the hardness of different pieces of wood may be different, current of the electric screw drivers will be different. Normally, during using of the screw drivers, the user should drill the screw head up to a surface close to the workpiece, thereby, the user needs to watch the drilling process very carefully in order to stop the motor when the screw head reaches the end. Thus, the screw may not go too deeply into the piece of wood what it undesirable. Otherwise, it can prevent the motor from overloading when the screw head is incautiously screwed into the wood board.

It is prior art to use some overload protection device. This may be a mechanical clutch, which disengage the tool bit from the driving motor when the motor current exceeds a predetermined limit value. A torque collar, which is rotatable and marked with plurality of scales, is provided in the front of the housing of which power tool has such overload protection device. These scales indicate the torque limiter. The user should preset the limited torque value by the rotatable torque collar, that is, when the output torque reaches or exceeds the predetermined value, the clutch will automatically start to disengage the tool bit of the power tool and the motor. Additionally, electric screwdrivers with such overload protection device has a sleeve extending from the front end of the housing, the front end of the sleeve is aligned with that of the tool bit of the electric screwdriver. When the screw head reaches the wood board surface, the front end of the sleeve also reaches it, if the screw is pressed further, the sleeve will be biased to actuate the clutch in the housing, thereby disengaging the tool bit and the motor. However, the above mechanical clutch is complex in structure and it is complicated and costly to be made.

BRIEF SUMMARY OF THE INVENTION

It is an object of the invention to provide a method for an electric tool which method makes sure in a tool that the work piece operated by the tool bit reaches a predetermined position, and that the work piece does not go beyond this position.

And it is also an object of the invention to provide a tool of the afore-mentioned type in which such method can be carried out.

In an embodiment a method for controlling an electric tool is provided. The electric tool includes an electric motor and an output shaft which is driven by the electric motor and configured for outputting a rotary torque to drive a tool bit to work on a work piece. The control method includes: measuring a parameter representing the load on the output shaft in dependence on time, calculating a second or higher derivative of the parameter in dependence on time, generating a control signal according to the second or higher derivative, and changing a rotational speed of the electric tool in response to the control signal.

According to another aspect of the invention, there is provided an electric tool, having an output shaft for driving a tool bit to enable the tool bit to rotate at a speed; an electric motor rotatable to drive the output shaft; a power supply for supplying power to the electric motor; a sensor by which is measured the parameter representing the load on the output shaft; a control component configured to calculate a second or higher derivative of the parameter in dependence on time, and generate a control signal according to the second or higher derivative to change a rotational speed of the electric motor.

The method automatically detects whether the work piece operated by the tool bit reaches a predetermined position by electronic control means. It may make sure that a screw is driven into a piece of wood and does not go beyond the predetermined position once it detects that the work piece reaches the position and carries out the changing action. There is no complicated mechanical clutch so that it is simple to be made and the cost is decreased.

BRIEF DESCRIPTION OF THE DRAWINGS

Other embodiments and advantages will be obvious from the following description of the drawings, depicting specific embodiments of the invention.

DETAILED DESCRIPTION OF EXEMPLARY EMBODIMENT(S)

The control method of the present invention may be adapted to be used on many kinds of power tools. The electric screwdriver described below is an exemplary embodiment.

Figure 1:
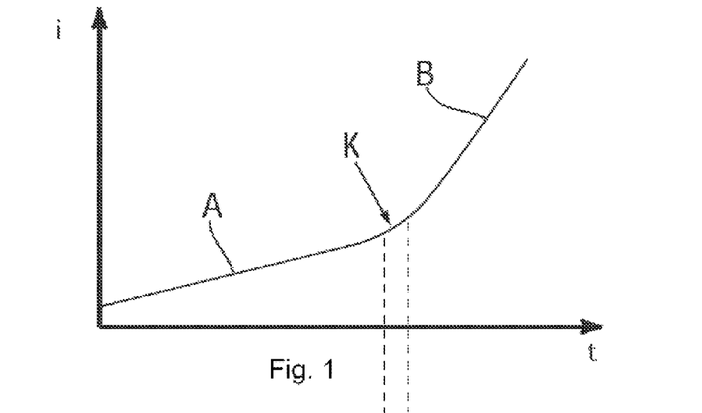
FIG. 1 is a typical diagram of a conventional electric screw driver, wherein a current is illustrated versus time.

Please referring to FIG. 1, an i(t) diagram of a conventional electric screw driver is illustrated. With regard to FIG. 4, the user presses the screw driver 2 against a working head 14 which shall be driven into a board of wood 16, the working head in this embodiment is a screw. Pressing is performed with approximately constant pressure. The letter t represents the time that the screw drilling into the board and consequently the position of screw in the board. And the letter i represents the current supplied to the electric motor of the screw driver and thereby the load or force that is provided by the motor.

Curve in FIG. 1 contains a first portion A, a second portion K and a third portion B. Wherein, the first portion A is an increasing slope and which represents the screwing process of the screw main body drilling into the board of wood. This rise may be linear or slightly bended or curved. The second portion follows the first portion A. It may be called as knee portion K. This knee portion K is a positive variation of the slope. In other words: It is a sudden variation having on upward inclination with respect to the first portion A. This represents the start of touching on the surface of the wood board by the screw head. And the third portion B follows the knee portion K. This rise may again be linear or slightly bended or curved. Yet, the curve B is much steeper than the curve A.

In fact, curve shown in FIG. 1 represents the working condition of a power tool which does not carry out the control method of the present invention, the third portion B of the curve represents that high current will be generated in the power tool and may lead to insert even the head into the piece of wood. Therefore, it is essential to take some action to avoid such an excessive current following the knee portion K.

When the screw is rotated to a position corresponding to the knee portion K, further rotation will insert the screw head into the wooden board and maybe damage the motor. Therefore, the invention is based on automatically detecting of the knee portion K and then starting precaution measures automatically.

The detection of the knee portion K in this embodiment will be explained with regard to FIGS. 2 and 3.

Figure 2:
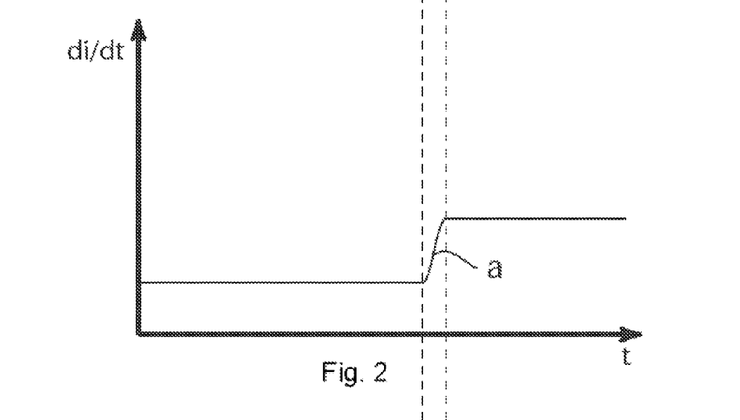
FIG. 2 is a diagram, wherein a first derivative of the current of FIG. 1 is depicted versus time.

In FIG. 2, the first derivative di/dt of the current I versus time t of the diagram of FIG. 1 is shown. The first and third portion A and B in FIG. 1 respectively are corresponding lines parallel to the base line of t in this figures, while the second portion K is a sharp positive increase or rise curve in this diagram.

Figure 3:
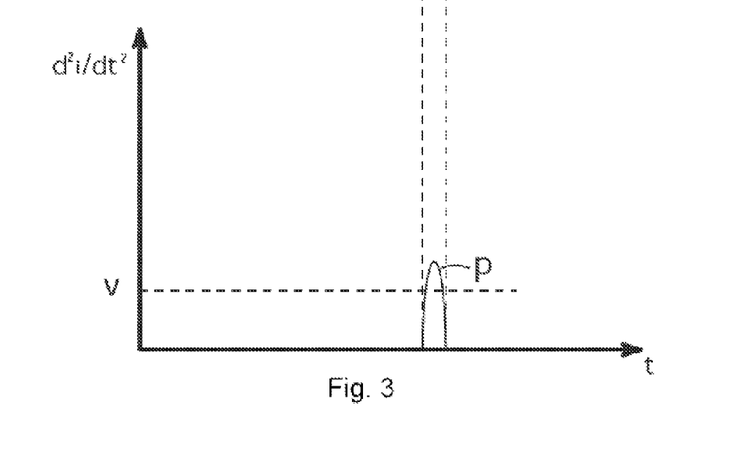
FIG. 3 is a diagram, wherein a second derivative of the current of FIG. 1 is depicted versus time.

According to FIG. 3, the second derivative $d^2i/dt^2$ of the current i shown in FIG. 1 is formed in dependence on time t.

The values in the first and third portion are zero after being derivated twice, whereas the second portion K is shown as a parabola with downward opening. A kind of peak signal p is formed in the top region of the parabola, which is particular region including the vertex. With regard to FIG. 4, a control signal s is generated when the peak signal p is formed. Of course, in the exemplary embodiment, a predetermined threshold value v is set. The control signal s is only generated if the peak signal p is positive and exceeds the predetermined threshold value v. As is easy for a person skilled in this art to understand, the control signal s may be generated after the first derivative of current I in dependence on time t is formed. For example, via a capacitor, the control signal s is generated after detection of the first derivative exceeding a predetermined threshold value.

Figure 4:
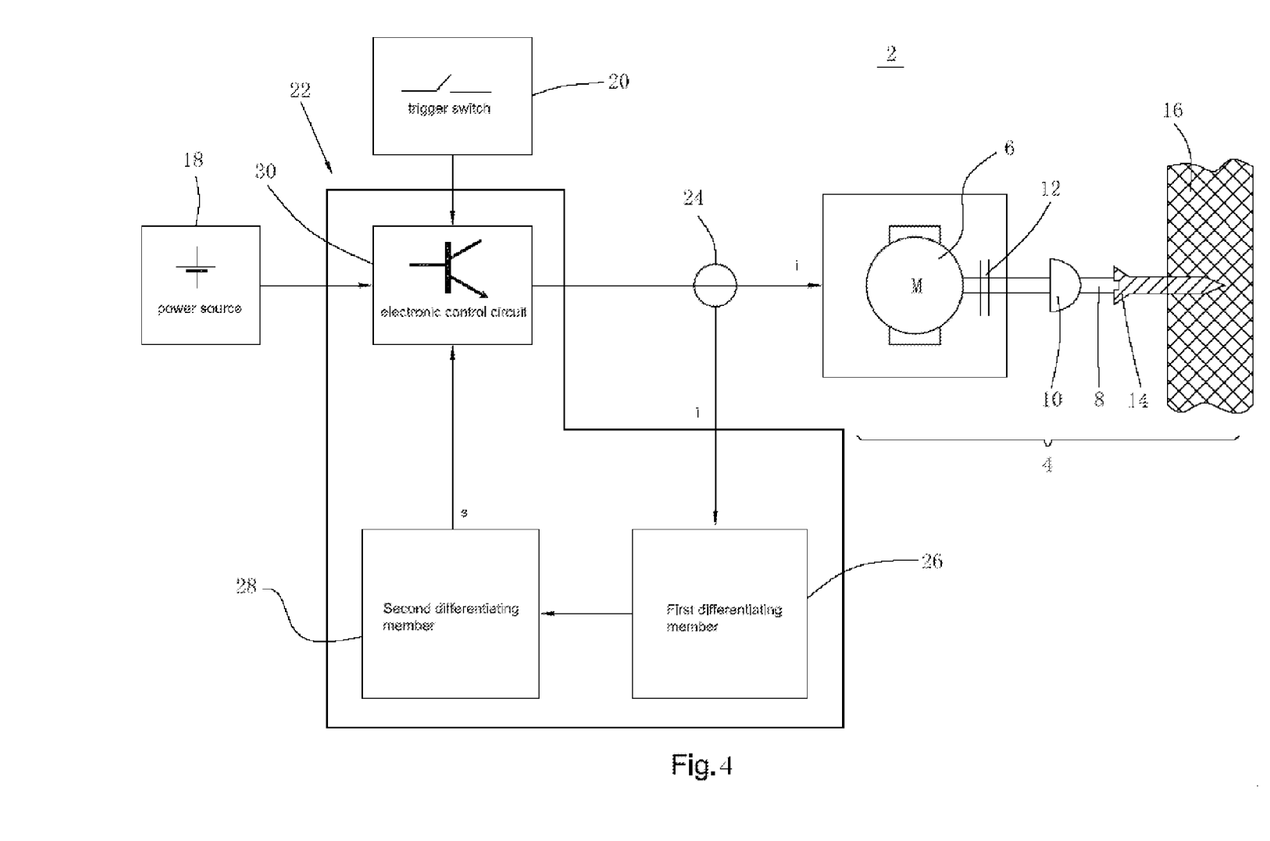
FIG. 4 is a work principle chart of a power tool according to the first basic version of the present invention.

FIG. 4 illustrates an electric tool which carries out the above-mentioned control method. Herein below an electric screw driver is also illustrated as an exemplary embodiment. The electric screw driver 2 includes a working assembly 4, a power source 18 and a switch 20. The working assembly 4 includes an electric motor 6 for driving a tool bit 8 to rotate, and drive screw 14 into a wooden board 16. The tool bit 8 which is connected to the electric motor 6 via a mechanical spring, a clutch system 12 and a chuck 10 in serial. Of course, in the present embodiment, the clutch system 12 may be omitted. A power source 18, in this example is a DC source or a rechargeable battery, supplies an electric DC current i to the motor 6, provided a hand trigger switch 20 is closed. Of course, as is easy for a person skilled in this art to understand, AC power source may be substituted for the DC source of this embodiment.

An electronic control device 22 and a current sensor 24 are connected between the power supply 18 and the electric motor 6. The electric screw driver 2 also includes a first differentiating member 26 and a second differentiating member 28. In the present embodiment, the current sensor 24 detects the current i supplied to the motor and delivers a signal proportional to the current i measured by the sensor 24, to the first differentiating member 26. This first differentiating member 26 gets a first derivative di/dt in dependence on time t shown as FIG. 2, and generates a signal proportional to the first derivative, and then delivers it to the second differentiating member 28. The second differentiating member 28 gets again a second derivative shown as FIG. 3. Thus, the second differentiating member 28 generates a control signal s when a preset condition, which the peak signal p as mentioned above is positive and its value exceeds the predetermined threshold value v is occurred. In this embodiment, the control signal is used for reducing or interrupting the energy supply to the motor 6. In other words, the control signal s is used to bring the motor current i to a lower value or to zero for decreasing the rotational speed of the motor or stopping the motor. Of course, the control signal s may also be used to reverse the current i to obtain a quick stop of the motor 6. In this embodiment, the control signal s will be transmitted to a electronic control device 22, and corresponding actions will be carried out by the electronic control device 22. These actions may happen immediately or after a predetermined delay time after the occurrence of the peak signal p. The delay may be happened in the electronic control device 22 or be provided by a separate delay unit.

In FIG. 4, the electronic control device may include a switch in the form of a transistor for turning off the current i supplying to the motor.

In the exemplary embodiment, the electronic control device 22 may contain a microprocessor, and the functions of the first differentiating members 26 and the second differentiating member 28 and possibly a delay member may be fulfilled by the software present in this microprocessor. In other words, the whole electronic control device 22 is a microprocessor.

In other alternative embodiments, the current i supplied to the motor 6 is measured in consecutive time intervals Δt, which may be equal to each other. The measured current i is digitally processed. In doing so, the first time derivatives di/dt measured in two consecutive time intervals Δt are compared with each other. If this comparing shows that the first time derivative in two consecutive time intervals Δt are substantially different from each other (this corresponds to the second derivative mentioned above), that means the screw head has reached the wood board 16, and the afore-mentioned control signal s is generated.

The afore-mentioned embodiment automatically detects whether the work piece operated by the tool bit reaches a predetermined position by providing electronic control means. It makes sure that the working head does not go beyond the predetermined position once detection of the working head reaches the position and carries out corresponding actions.

Figure 8:
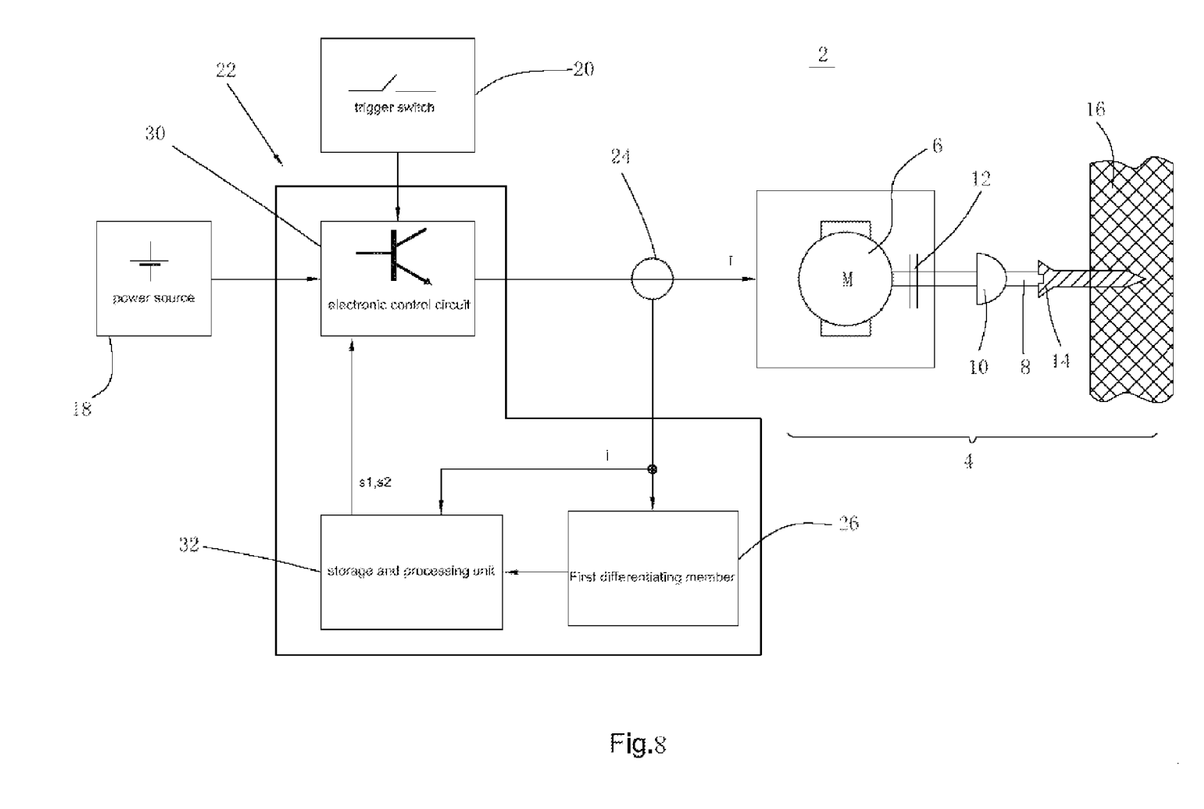
FIG. 8 is a work principle chart of a power tool according to the second basic version of the invention.

FIG. 8 is a work principle chart of a power tool according to a second basic version of the present invention.

In FIGS. 5-8, a second basic version of the method and the power tool according to the invention is illustrated. Various embodiments will be described in dependence on the basic version of the invention.

Figure 5:
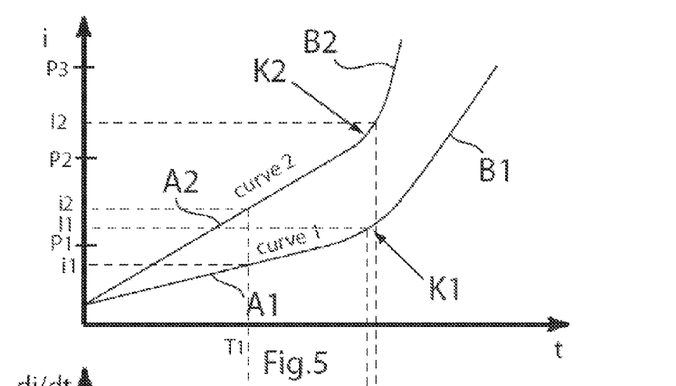
FIG. 5 is a diagram of an electric screw driver, wherein two currents i1, i2 of two different conditions are illustrated versus time.
Figure 6:
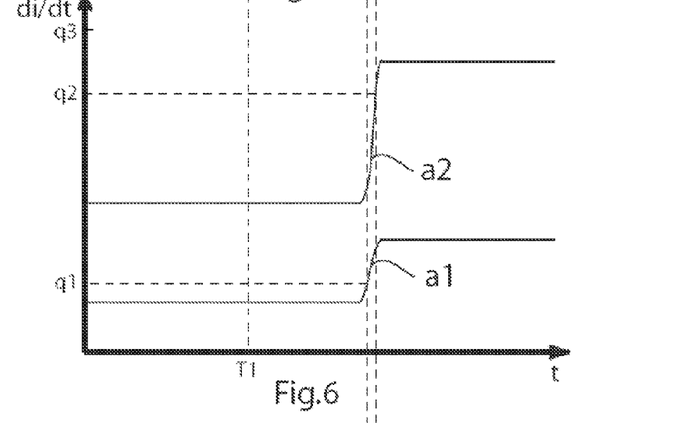
FIG. 6 is a diagram, wherein the first derivatives di/dt of the currents i1 and i2 are depicted versus time.

The diagram of FIG. 5 shows the motor current i versus time t. In the present embodiment, the motor current i is a DC current of an electric screw driver which drives a tool bit. Two measured current curves A1 and A2 are illustrated. Again, the principle of clocking is used for measuring and processing the motor current i. It is a known technology for a person skilled in the art, and the applicant will not describe it in detail. In the diagram of FIG. 6, derivatives of the current curve A1 and A2, respectively, are shown. The first curve A1 relates to a relatively soft work-piece, such as wood, and/or a relatively small screw, while the second curve A2 relates to a harder work-piece and/or a bigger screw. Whatever the condition is, measuring and processing for these curves A1, A2 is done in the control device 22 (shown in FIG. 8). In the exemplary embodiment, the control device comprises a microprocessor.

In an exemplary first embodiment of the second basic version, at a predetermined point of time T1, the current i is specifically measured. In the microprocessor, there is stored a single threshold value, which will be termed first threshold value P1. This first threshold value P1 may be, for instance, P1=5 A at T1. If i1<5 A at T1, it is determined that a soft board is worked on, and if i1>5 A at T1, it is determined that a hard board is worked on. With regard to FIG. 6, if i1<5 A, the microprocessor will assign a first predetermined derivative value q1, and if i1>5 A, the microprocessor will assign a second predetermined derivative value q2. Both predetermined derivative values q1, q2 are stored in the microprocessor. The first predetermined derivative value q1 may be, for instance, q1=0.4 A/s, and the larger second predetermined derivative value q2 may be, for instance, q2=1 A/s. Thus, if the motor current i1 is below P1 at T1, the first predetermined derivative value q1 is selected, and if the current i1 is above P1 at T1, the second predetermined derivative value q2 is selected.

In FIG. 6, the first derivative of the current according to curve A1 and curve A2 is depicted as curves a1 and a2, respectively.

Figure 7:
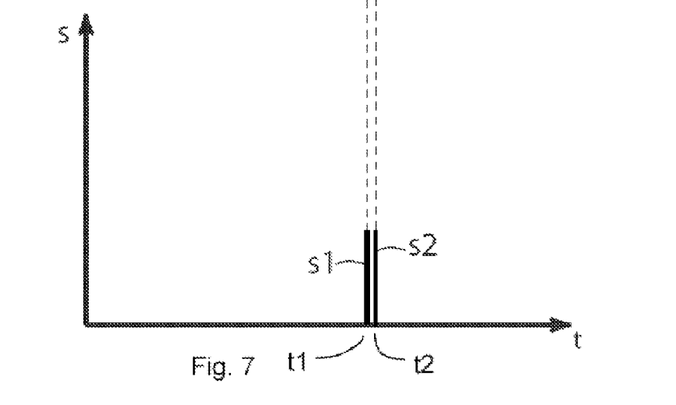
FIG. 7 is a diagram, wherein control signals s1, s2 obtained from processing the derivatives of FIG. 6 are illustrated versus time.

It will be realized from FIG. 6 that there is a steep increase portion of the curves a1 and a2 which correspond to the strongly bent portions of the curves A1 and A2, i.e. where the curves A1 and A2 have knee portions K1 and K2, respectively. As afore-mentioned, the knees K1 and K2 represent that the screw heads touch the wooden work piece. These knees K1 and K2 are used in the microprocessor to form control signals s1 and s2 (as shown in FIG. 7), respectively. The predetermined first derivative values q1, q2 are located at the steep increase of the curves a1, a2, respectively.

As shown in FIG. 7, the first control signal s1 is generated in the microprocessor at the point of time t1, when the first derivative di/dt has reached the first predetermined derivative value q1. When the second curve A2 has to be considered according to the measurement at the point of time T1, the second control signal s2 is generated at the point of time t2, when the first derivative di/dt has reached the second predetermined derivative value q2.

In response to the control signal s1 or s2, the rotational speed of the DC motor attached to the power tool is reduced or the motor is even stopped.

In other words: At the predetermined point of time T1, for instance 1 or 2 seconds after starting the motor, the microprocessor reads the current i. If there is a small screw and/or a soft work-piece of wood, the current i is also relatively small, and the current will follow the first curve A1 shown in FIG. 5. The measured current at the first point of time T1 is the first current i1, which may be e.g. 3 A, the microprocessor selects the first predetermined derivative value q1 (stored therein) to be compared with the first derivative di/dt. When di/dt reaches q1, the corresponding point of time is t1, the corresponding current is i1, the speed of the motor will be reduced by the first control signal s1 generated from the first predetermined derivative value q1. If the working head is a bigger screw and/or the work piece is a piece of harder wood board, the current will follow the second curve A2 shown in FIG. 5. Thus, the measured current at the point of time T1 is the second current i2 which is higher than the first current i1, for instance, i2 may be 7 A. Therefore, at T1 the microprocessor will select the predetermined derivative value q2 (stored therein). As soon as the value of di/dit on the curve a2 reaches q2, the corresponding point of time is t2, the corresponding current supplied to the motor is i2, the speed of the motor will be reduced by the generated second control signal s2.

In an exemplary second embodiment of the second basic version, at a predetermined point of time T1, the current i is also specifically measured. Here it will be determined in the microprocessor whether the measured value of the motor current i at T1 is below a predetermined first threshold value P1, such as the illustrated current value i1, or whether it is above the predetermined first threshold value P1, but below a larger second predetermined threshold value P2, such as the illustrated current value i2. If it corresponds to the first current value i1, the first curve A1 is assigned a predetermined derivative value q1. And if it corresponds to the second current value i2, the second curve A2 is assigned a larger predetermined derivative value q2. From now on, the method will follow the steps as explained in the first embodiment. The first derivative di/dt at the knees K1, K2 is again used in the microprocessor to form a control signal s1 or s2, respectively.

It will be noted that in the first embodiment just one predetermined threshold value P1 is used, whereas in the second embodiment two predetermined threshold values P1 and P2 are used.

This may also apply to the second embodiment: If the working head is a very big screw and/or the work-piece is specifically hard, a third threshold value P3 (shown in FIG. 5) and a third predetermined derivative value q3 (shown in FIG. 6) which stored therein will be used in the microprocessor. It should be mentioned that then the set of predetermined threshold values P1, P2 and P3 as well as the predetermined derivative values q1, q2 and q3 is stored in the microprocessor for being individually called upon a request in accordance with the measured current i1, i2, and i3, respectively, at a predetermined point of time T1. Of course, even more sets of predetermined threshold values P and predetermined derivative values q may be used.

With a number of tests, (e. g. with different screws in specification and different kinds of wood in material and specification), the predetermined threshold values P and the predetermined derivative values q should be determined and stored in the microprocessor.

FIG. 8 illustrates an electric tool 2, in particular a screw driver, incorporating an embodiment of the present invention in accordance with the second basic version. Most of the members of the illustrated embodiment are the same with or similar to the members of FIG. 4. Therefore, the same reference numerals will be used.

The working assembly 4 of the electric screw driver shown on the right side of FIG. 8 includes an electric DC motor 6 for driving a tool bit 8 attached to a chuck 10. The chuck 10 is connected to the electric motor 6 via a mechanical spring and a clutch system 12. The tool bit 8 is provided for rotating and thereby driving a screw 14 into a wooden board 16. A power source 18 is a DC source, and may be a rechargeable battery, supplies an electric DC current i to the motor 6, provided a hand trigger switch 20 is closed.

The power supply 18 is connected to the electric motor 6 via an electronic control device 22 and a current sensor 24. The current sensor 24 measures the current supplied to the motor and generates a signal proportional to the measured current and delivers a signal to a differentiating member 26. This differentiating member 26 generates a signal proportional to the first derivative di/dt in dependence on time t. The output of the differentiating member 26 is connected to the input of a storage and processing unit 32.

The storage and processing unit 32 has stored therein, according to the afore-mentioned first embodiment, a single threshold value P1 and a first and second predetermined derivative value q1 and q2, respectively. At a predetermined point of time T1, the storage and processing unit 32 selects the first predetermined derivative value q1, if the measured current i1 is below the threshold value P1, or it selects the second predetermined derivative value q2, if the measured current i2 is above the threshold value P1. The second predetermined derivative value q2 is larger than the first predetermined derivative value q1. The storage and processing unit 32 also generates a corresponding control signal s1 or s2, when the first derivative di/dt has reached the first or second predetermined derivative value q1, q2. Here the screw head has reached the piece of wood. And the storage and processing unit 32 supplies the control signal s1 or s2 to the electronic control device 22. This control device 22 provides for reducing or interrupting the energy supply to the motor 6. In other words, the control signal s1, s2 is used to bring the motor current i to zero or to another lower value for stopping the motor or decreasing the rotational speed of the motor to substantially zero. In the present embodiment the control signal s acts on an electronic control circuit 30 for this purpose. This control may happen immediately or after a predetermined delay time after the occurrence of the signal p. This signal s1 or s2 may also be used for reversing the current i to obtain a quick stop of the motor 6.

In the exemplary embodiment, the electronic control device 22 may contain a microprocessor, and the functions of the differentiating member 26, the storage and processing unit 32 and also of the electronic control circuit 30 and possibly of a delay member (not shown) for delaying signal s may be fulfilled by the software of this microprocessor. In other words: the whole electronic control device 22 may be represented by a microprocessor.

Figure 9:
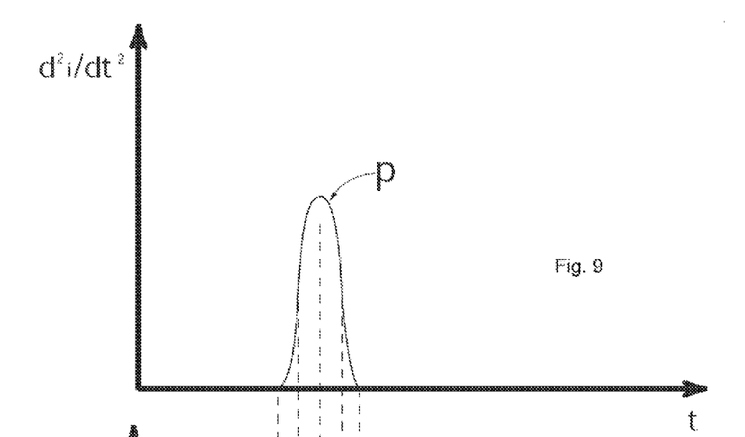
FIG. 9 illustrates the second derivation of the current versus time of an electric screw driver, similar to FIG. 3.
Figure 10:
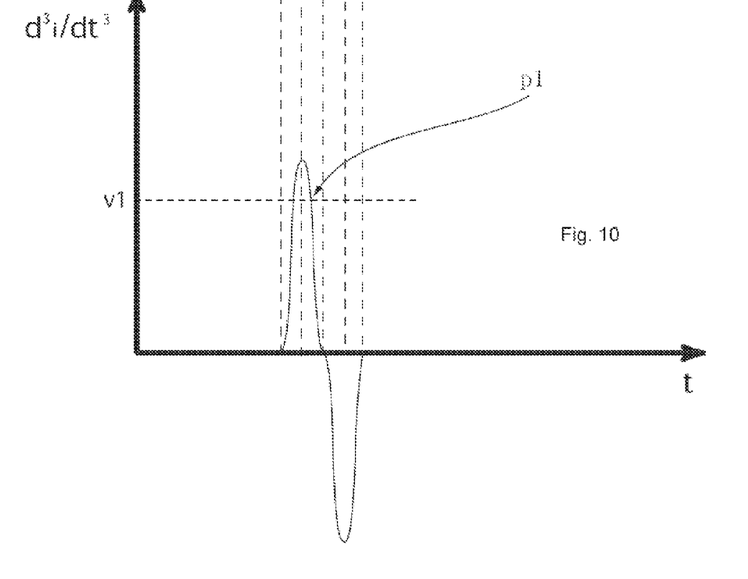
FIG. 10 shows the third derivation of the current versus time which is obtained from FIG. 9.
Figure 11:
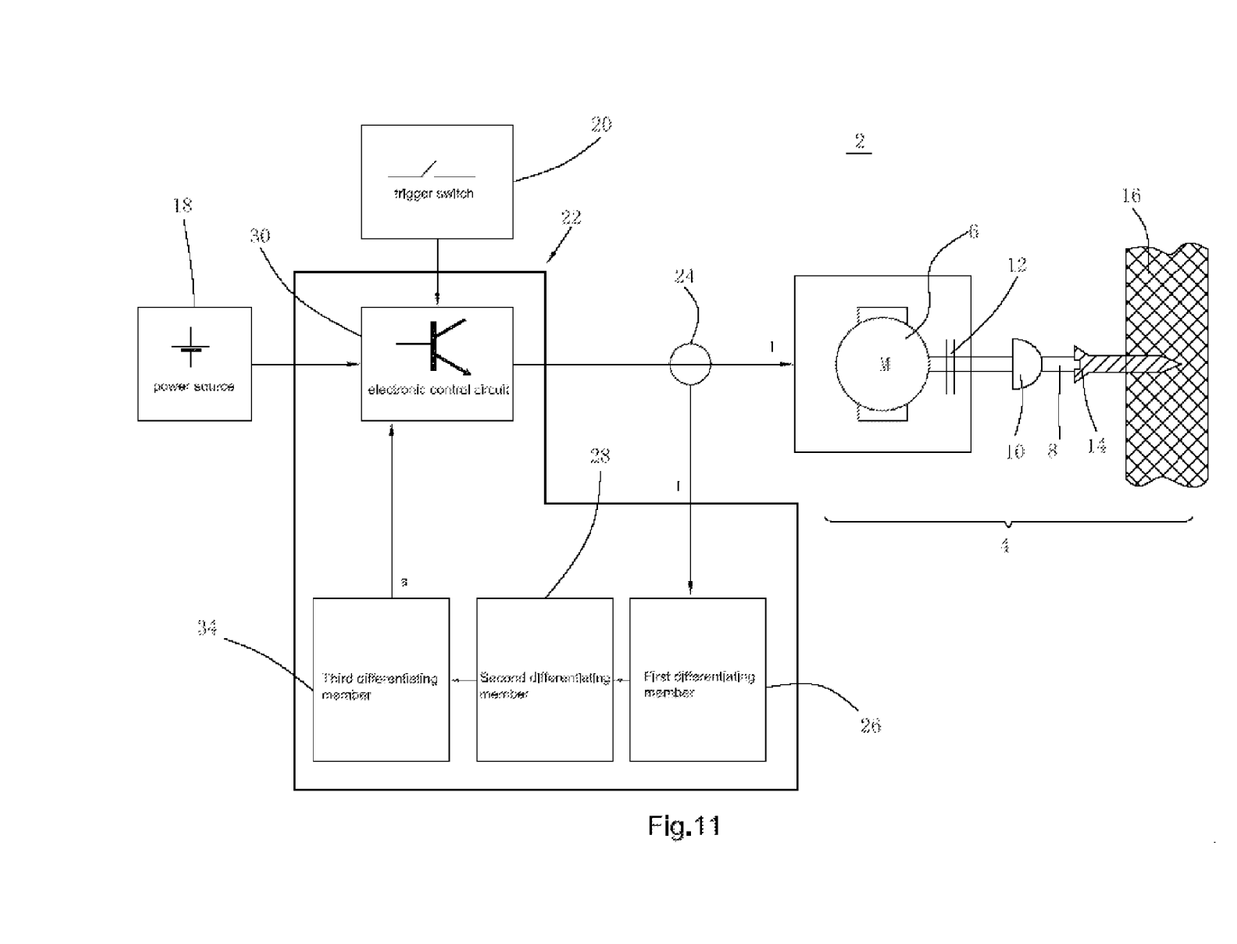
FIG. 11 is a work principle chart of a power tool according to the third basic version of the present invention.

In FIGS. 9-11 a third basic version of the method and the power tool according to the invention is illustrated. It is to an extent based on the first version as explained with reference to FIGS. 1-4. Therefore, only the differences will now be described. This third basic version uses the third derivative of the current i in dependence on time for reducing the speed of a tool 2.

In this embodiment, the method follows the various steps shown in and described with reference to FIGS. 1 to 3. In FIG. 9 the second derivative $d^2i/dt^2$ in dependence on time t is shown as a repetition, which has already been shown in FIG. 3. Shown as FIG. 10, the third derivative $d^3i/dt^3$ is generated from the second derivative $d^2i/dt^2$. And when the peak of the third derivative $d^3i/dt^3$ appears and when its value is positive and it exceeds a given threshold value v1, the control signal s is generated. The signal s is correspondingly used for reducing the speed of the electric tool 2.

A skilled person in the art knows accordingly to generate a control signal s through measuring the $4^{th}$, $5^{th}$ or higher derivative. It is easy to conclude, so the applicant will not describe in details here.

Shown as the circuit illustrated in FIG. 11, it will be noted that the output signal of the second differentiating member 28 is supplied to a third differentiating member 34, in which the third derivative $d^3i/dt^3$ is formed. Of the output signal of the third differentiating member 34, the positive pulse p1 is fed into the electronic control circuit 30. It is considered to be the control signal s. By means of the electronic control circuit 30, it causes a reduction or even complete elimination of the DC current i in the motor 6.

Again it must be noted that all elements composed of the control device 22 can be replaced by a microprocessor.

In accordance with the afore-mentioned second embodiment, the storage and processing unit 32 may have stored therein a predetermined derivative value q2. Or it may contain plurality sets of predetermined derivative values q1, q2, q3 . . . and threshold value P1, P2, P3 for processing.

The procedure and protection apparatus described above in FIGS. 5-8 again have the advantage that a fast and reliable response is obtained when the head of the screw 14 reaches the board 16. The protection apparatus is all-electronic.

It should be noted that the first derivative, the second derivative or the higher derivative is not only a derivative defined in mathematics, but also simple equivalents based on the differentiating principle of engineering practice. For example, the first derivative may also be represented as a current change $\Delta i$ between consecutive time intervals $\Delta t$, that is $\Delta i/\Delta t$. In order to be easily used in engineering, $\Delta t$ should be a extremely small constant value, such as $\Delta t=10$ ms. Thus, if the differences of the current is checked continuously, a counting for a first derivative should be realized equivalently. For example, the current values detected at continuous fixed time intervals are i1, i2, i3, i4, i5 . . . , so the corresponding first derivatives are i2−i1, i3−i2, i4−i3, i5−i4 . . . , and the second derivatives are i3−2i2+i1, i4−2i3+i2, i5−2i4+i3 . . . . And, in this way, the first derivative is not needed to be calculated in advance and the second derivative can be obtained directly. In this way, the analogue equivalent transformation of higher derivatives is enclosed in the derivative sense of the invention.

Another embodiment generating the control signal based on the second or higher derivative will be discussed as below. Taking the second derivative for an example, an electric screw driver during working causes the abnormal mutation of the working current, so the obtained second derivative is interfered. Those abnormal conditions comprise: sudden current rise caused when a screw runs into a knurr of a wood plate in the process of being screwed into the wood plate; the large increase of the current when the electric motor is just started and detection is carried out when the electric motor does not run stably; current mutation resulted from rapid voltage decrease of a battery pack due to over discharge when the direct battery pack is used as the power supply; or current mutation caused by sudden joggling of the arm of the user during use. If the screw is not screwed into the wood plate completely in case of the abovementioned conditions, the second derivative calculated by current in dependence on time may be interfered, which means, the second derivative generated at this time may reach or exceed the predetermined threshold value v (as shown in FIG. 3), while the control component such as a control device 22 as shown in FIG. 4 will take it granted that the screw has been screwed into the wood plate completely and cut off the power supply of the electric motor, which is obviously unacceptable to the user.

When the abovementioned abnormal conditions happen, the current value at this time usually is smaller than that after the screw is screwed into the wood plate completely. In order to solve these problems, the control component can make the value of the second derivative multiplied by the corresponding current value (namely the current value based on which the second derivative obtained at this time), and preset a new threshold value for the product, and if the product of the second derivative and the corresponding current is a positive value and greater than or equal to the new threshold value, the corresponding control signal is generated to reduce the speed of the electric motor or close down. Obviously, the new threshold value is far greater than the original threshold value v. By this means, the difference between the actually desired second derivative and the second derivative being interfered is amplified, so the desired second derivative can be reserved by using the bigger threshold value. Of course, in other embodiments, the product of the current or the first derivative or the second derivative and a fixed constant, the higher power of the current or the first derivative or the second derivative, the product of the current and the corresponding first derivative, the product of the second derivative and the corresponding first derivative, the product of the second derivative and the corresponding first derivative as well as the current, the tangent function value (such as tan (89+first or second derivative)) of the first or second derivative with a certain value approximate to 90, the cotangent function (such as c tan (first or second derivative)) of the first or second derivative, or the logarithm of the difference between 1 and the first or second derivate to base number which uses an arbitrary value a (such as log a(1−first or second derivative)), is compared with the corresponding threshold value, when the abovementioned value (namely the absolute value) is greater than or equal to the corresponding threshold value (which is positive), the control signal is generated to reduce the speed of the electric motor or close down. In other words, the control component compares the value of the function of the second derivative of the current with a predetermined threshold value, and if the value of the function of the second derivative is greater than or equal to the predetermined threshold value, sends the control signal to reduce the speed of the electric motor or close down. It is well-known to the common technician in the field that the abovementioned embodiments can also be applied to higher derivatives, and the applicant does not give unnecessary details hereon.

Figure 12:
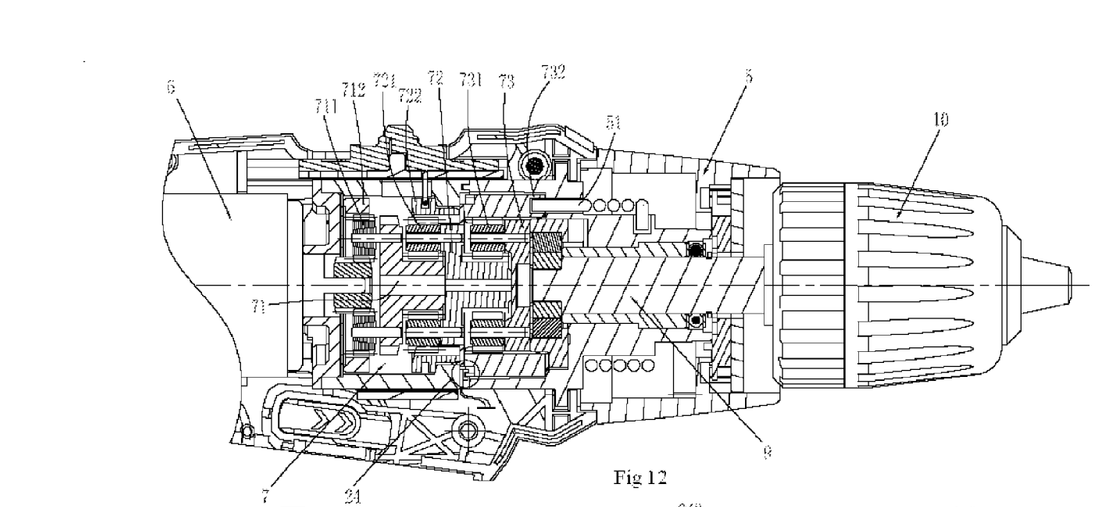
FIG. 12 is a cutaway view of a power tool according to another embodiment of the present invention.
Figure 13:
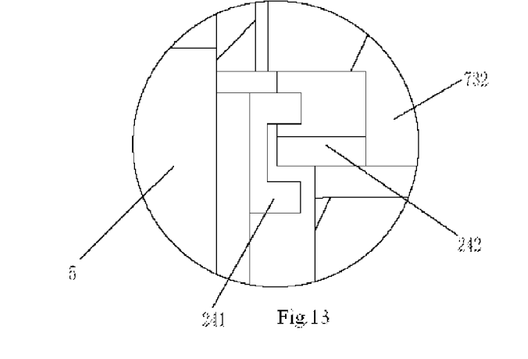
FIG. 13 is a magnified view of a portion in the FIG. 12
Figure 14:
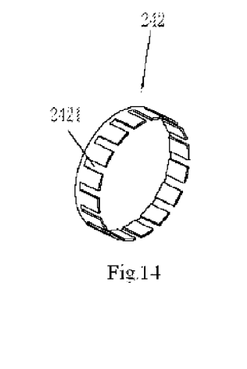
FIG. 14 is a perspective view of the blanking disc in the FIG. 13.
Figure 15:
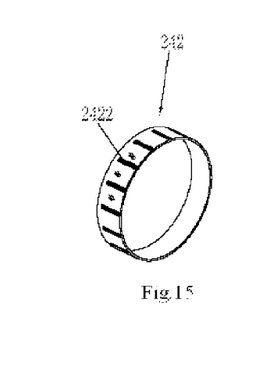
FIG. 15 is perspective view of the blanking disc in FIG. 13 in another embodiment.

FIGS. 12 to 15 disclose a detailed detection mode. As shown in FIG. 12, in the embodiment, the electric screw driver 2, for instance, comprises a housing 5, a motor 6 arranged in the housing, an output shaft 9, a gear reducing mechanism 7 connected between the motor 6 and the output shaft 9, and a chuck 10 arranged on the shaft 9. In the embodiment, the gear reducing mechanism 7 is a triple planetary gear reducing mechanism comprising first, second and third planet carriers 71, 72 and 73, several first, second and third planet wheels 711, 721 and 731 arranged on the corresponding planet carriers, and first, second and third gear rings 712, 722 and 732 mounted on the peripheries of the corresponding several planet carriers. In the embodiment, a torsional spring 51 is arranged between the housing 5 and the third gear ring 732, wherein one end of the torsional spring 51 is fixedly arranged opposite to the housing 5, while the other end is fixedly connected with the third gear ring 732. When the load on the output shaft 9 changes, the third gear ring 732 can overcome the torsion force of the torsional spring 51 and rotates. The sensor component 24 is also arranged between the housing 5 and the third gear ring 732. In amplified structure as shown in FIG. 13, the sensor component 24 comprises a sensing part 241 arranged on the housing 5 and a moving part 242 fixedly arranged on the third gear ring 732. In the embodiment, the sensing part 241 preferably is a photoelectric sensor, and the moving part 242 preferably is a circular blanking disc. As shown in FIG. 14, the blanking disc 242 comprises a plurality of through holes 2421 formed on the circumference. Moreover, as shown in FIG. 15, the blanking disc 242 can also be made from light-transmitting materials, and a plurality of light-tight strips 2422 are uniformly arranged on the circumference of the blanking disc 242.

When the third gear ring 732 rotates, it drives the blanking disc 242 to rotate relative to the photoelectric sensor 241, light rays emitted from the photoelectric sensor 241 are blanked by the blanking disc 242 or pass through the through holes 2421 of the blanking disc 242, the photoelectric sensor 241 records the numbers of the through holes 2421 through which the light rays pass, and generates a pulse signal (each pulse represents angular displacement, namely angular displacement/pulse), the signal is transmitted to the control component which converts the pulse signal into corresponding angular displacement through calculation, meanwhile, the torque of the torsional spring 51 is acquired by multiplying the rigidity (torque/angle) of the torsional spring 51 by the angular displacement, so the load torque applied onto the output shaft 9 is obtained. In the embodiment, the load torque of the output shaft is obtained by detecting the displacement of the gear ring relative to the housing. Of course, in other embodiments, it can be represented or further calculated by detecting the pressure, applied onto the housing, of the inner gear ring (through a pressure sensor for example), or detecting the rotational speed of the planet carrier (through a hall sensor).

Figure 16:
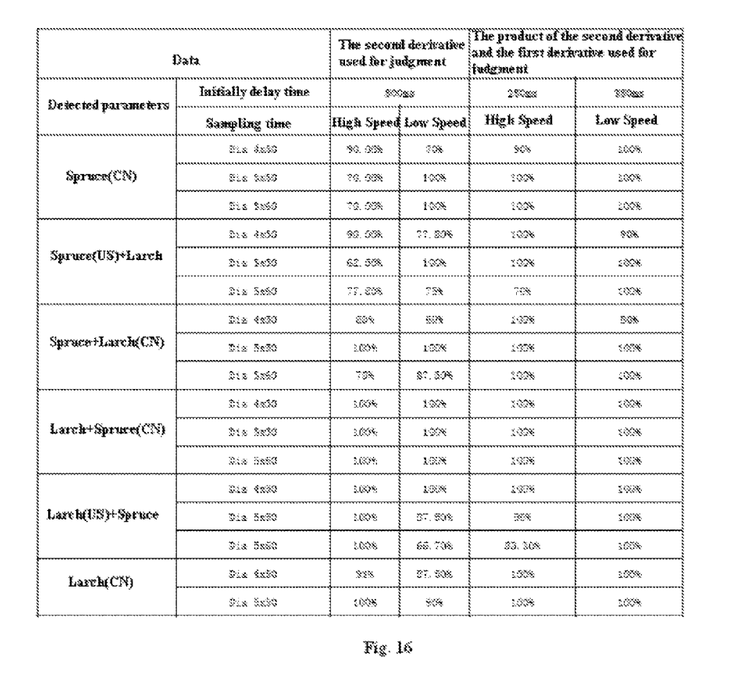
FIG. 16 is a diagram, which the test data from two exemplary embodiments of the present innovation are illustrated.

As shown in FIG. 16, the test and comparison of the abovementioned schemes prove that, by comparing the second derivative of the current with the predetermined threshold value, when screws with different diameters are screwed into the timbers of different textures, the success rate of generating the control signal to reduce the speed of the electric motor and close down are different. When the second derivative is used for judgment, in case of low rotational speed of the output shaft, the success rate of screwing D5X50 screws into different timbers can basically reach 100 percent; however, in case of high rotational speed of the output shaft, the judgment success rate is reduced. For example, when the D5X50 screws are screwed into spruce (CN), the success rate at a high speed state is 70 percent under the condition that the second derivative is used for judgment and that the predetermined threshold value is 3800. Under the same conditions, when the product of the second derivative and the first derivative is used for judgment and the predetermined threshold value is 600, the success rate is 100 percent. In other words, the success rate is lower when judging by the second derivative under the condition of high rotational speed of the output shaft, while judging by the function of the second derivative, the success rate is improved to a large extent. It is proved that, no matter the output shaft is at high speed or low speed state, when the screws with different dimensions are screwed into the timbers of different textures, by comparing the product of the second derivative and the first derivative with the predetermined threshold value, the success rate that the control system sends the control signal to reduce the rotational speed of the electric motor or close down is obviously higher than that of judging by simply using the second derivative and the predetermined threshold value. The function hereinabove of the second derivative is an outcome by computing the second derivative obtained by computing the detected parameter which represents the load on the output shaft and the detected parameter which represents the load on the output shaft or the function of the parameter.

Figure 17:
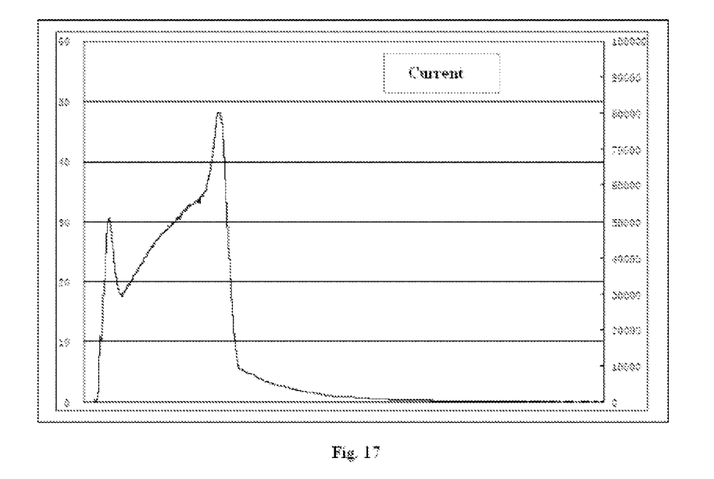
FIG. 17 is a current changing curve, in which the current sampled at intervals of 42 ms in another exemplary embodiment of the present innovation is illustrated.
Figure 18:
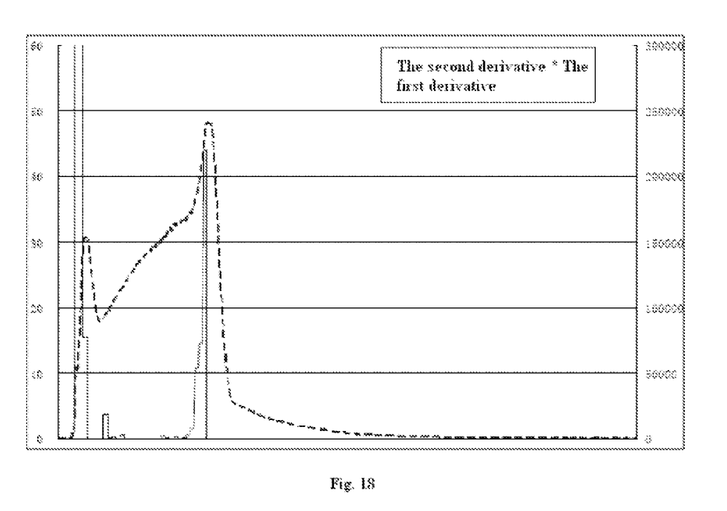
FIG. 18 is the product changing curve in the situation that current changed as illustrated in FIG. 17, the product calculated by multiplying the second derivative with the first derivative of current.
Figure 19:
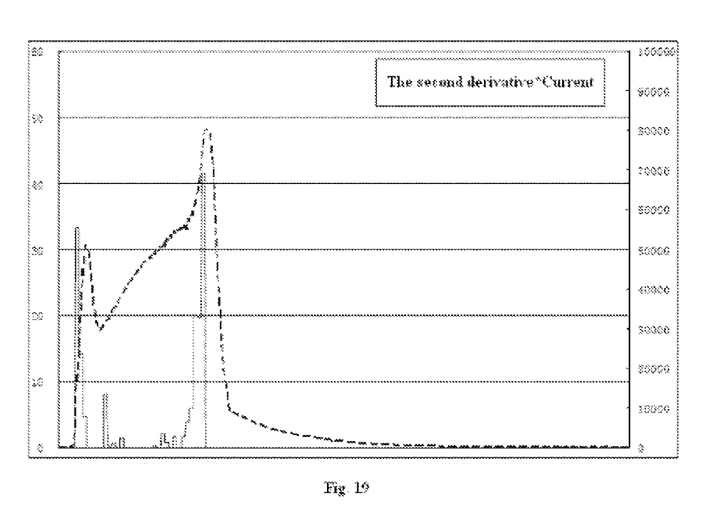
FIG. 19 is the product changing curve in the situation that current changed as shown in FIG. 17, the product calculated by multiplying the second derivative with the current.

Below is the description of different control methods resulting in different success rates by combining the current as shown in FIGS. 17 to 19, the second derivative of the current and the product of the second derivative of the current and the first derivative. Specifically, FIG. 17 is a current change curve diagram obtained by the control component which uses 42 ms as the sampling period. The current value of the electric motor is relatively large at the initial start state, gradually rises after a period of normal operation, and rapidly rises in case of relatively large load.

FIG. 18 is the change curve diagraph of the value obtained by computing the function of the product of the second derivative of the current and the first derivative of the current under the condition that current change as shown in FIG. 17. In the diagraph, the dotted line is a current change curve, and the full line is a curve representing the change of the product of the second derivative and the first derivative of the current. As shown in the figure, the rapid current change by adopting the function that the second derivative is multiplied by the first derivative, the value change, in particular the value is obviously amplified when the screw head contacts the surface of the timber. By means of the function, and by presetting a certain function threshold value, the time that the screw head contacts the timber surface can be effectively compared and distinguished, and most of interfered points can be effectively screened and filtered, so the success rate of control of the control component over the electric motor is improved. Under proper conditions, the function threshold value may be a fixed value.

FIG. 19 shows a numerical value change curve diagraph obtained by adopting the function that the second derivative of the current is multiplied by the current under the condition of current change as shown in FIG. 17, wherein the dotted line is a curve represents the change of the current, the full line is a curve representing the product of the second derivative of the current and the current. Identically, the current change state can be amplified through function computation, the product of the second derivative of the current and the current can reflect an expected knees, however, several big interfered points appear before the knees, therefore the control component needs to predetermined several threshold values to remove the interfered points and judges if the screw is screwed into the timber completely. At this time, the function threshold value may be a plurality of fixed values.

There are only two functions of the second derivates enclosed, but the technicians of the field shall know other functions related to the second derivates, such as the product of the second derivative and the first derivative as well as the current, or the square of the second derivative and the extraction computation of the second derivative, can also be applied in this circumstance.

In the above-mentioned embodiments, the current of the electric motor is used as the detection parameter to represent the load on the output shaft (namely the connection shaft positioned between the chuck 10 and the clutch system 12 as in the FIG. 8 and FIG. 11). In other words, when the screw is screwed into the timber, the output shaft has a resistance torque, and the change of the resistance torque can be reflected by detecting the current so as to judge whether the screw is fastened into the timber completely. Of course, it is well known by the technicians in the field that the parameter for representing the load on the output shaft is not limited to the current, it may be, for example, the voltage for detecting the drop of the voltage of the resistor connected with the electric motor in series; or the rotational speed, wherein the rotational speed of the electric motor or the output shaft is detected by adopting the hall sensor; or the efficiency of the electric motor, which is detected by calculating the ratio of the input power to the output power of the electric motor.

The abovementioned is described by taking the electric screw driver as an example. Certainly, the control method provided by the invention can also be applied to other electric tools, such as drills and wrenches. For the technicians in the field, the application is easily implemented through the abovementioned embodiment, so the applicant does not give unnecessary details here.

I claim:

1. A method for controlling an electric tool, the electric tool comprising an electric motor and an output shaft which is driven by the electric motor and configured for outputting a rotary torque to drive a tool bit to work on a work piece, the method comprising:
   measuring a current supplied to the electric tool in dependence on time,
   presetting a predetermined threshold value,
   calculating a second or higher derivative of the current in dependence on time,
   calculating a product of: i) the second or higher derivative and ii) the current,
   generating a control signal only when the absolute value of the product is greater than or equal to the predetermined threshold value, and
   changing a rotational speed of the electric tool in response to the control signal.

2. The method according to claim 1, wherein the electric tool further comprises a housing and a planetary gear mechanism accommodated in the housing, the planetary gear mechanism comprising a planet carrier, a planet wheel arranged on the planet carrier and a gear ring arranged around the planet wheel.

3. The method according to claim 1, wherein a function value of the second or higher derivative includes a function factor of the product of the second derivative and a first derivative.

4. The method according to claim 1, wherein the control signal is configured to set the rotational speed of the electric tool to a low-speed level or zero, and the control signal is generated instantly or after the preset delay time.

5. An electric tool, comprising:
   an output shaft;

an electric motor configured to drive the output shaft to rotate, a power supply for supplying power to the electric motor, a sensor for measuring a current supplied to the electric tool, and a control component configured to preset a predetermined threshold value, to calculate a second or higher derivative of the current in dependence on time, to calculate a product of: i) the second or higher derivative and ii) the current, and to generate a control signal to change a rotational speed of the electric motor only when the absolute value of the product is greater than or equal to the predetermined threshold value.

6. The electric tool according to claim 5, wherein the control signal is configured to set the rotational speed of the electric tool to a low-speed level or zero, and the control signal is generated instantly or after preset delay time.

7. The electric tool according to claim 5, further comprising a housing and a planetary gear mechanism accommodated in the housing, the planetary gear mechanism comprising a planet carrier, a planet wheel arranged on the planet carrier and a gear ring arranged around the planet wheel.

8. A method for controlling an electric tool, the electric tool comprising an electric motor and an output shaft which is driven by the electric motor and configured for outputting a rotary torque to drive a tool bit to work on a work piece, the method comprising:

measuring a parameter representing the load on the output shaft in dependence on time, presetting a predetermined threshold value, calculating a second or higher derivative of the parameter in dependence on time, generating a control signal only when the function value of the second or higher derivative is greater than or equal to the predetermined threshold value, and changing a rotational speed of the electric tool in response to the control signal, wherein the parameter is one of a current supplied to the electric tool, a rotational speed of the output shaft, a voltage of the electric motor, the rotational speed of the electric motor and the efficiency of the electric motor.

9. The method according to claim 8, wherein the function includes a function factor of the product of the second derivative and a first derivative.

10. The method according to claim 9, wherein the control signal is generated only when the absolute value of the product of the second derivative and the first derivative of the parameter or the absolute value of the product of the higher derivative and the first derivative of the parameter is greater than or equal to the predetermined threshold value.

11. The method according to claim 8, wherein the control signal is generated only when the absolute value of the product of the second derivative and the parameter or the absolute value of the product of the higher derivative and the parameter is greater than or equal to the predetermined threshold value.

12. An electric tool comprising:

an output shaft, an electric motor configured to drive the output shaft to rotate, a power supply for supplying power to the electric motor, a sensor for measuring a parameter representing the load on the output shaft, and a control component configured to preset a predetermined threshold value and to calculate a second or higher derivative of the parameter in dependence on time, and to generate a control signal to change a rotational speed of the electric motor only when the function value of the second or higher derivative is greater than or equal to the predetermined threshold value, wherein the parameter is one of a current supplied to the electric tool, a rotational speed of the output shaft, a voltage of the electric motor, the rotational speed of the electric motor and the efficiency of the electric motor.

13. The electric tool according to claim 12, wherein the control signal is generated only when the absolute value of the product of the second derivative and the parameter or the absolute value of the product of the higher derivative and the parameter is greater than or equal to the predetermined threshold value.

14. The electric tool according to claim 12, wherein the control signal is generated only when the absolute value of the product of the second derivative and a first derivative of the parameter or the absolute value of the product of the higher derivative and a first derivative of the parameter is greater than or equal to the predetermined threshold value.

15. A method for controlling an electric tool, the electric tool comprising an electric motor and an output shaft which is driven by the electric motor and configured for outputting a rotary torque to drive a tool bit to work on a work piece, the method comprising:

measuring a parameter representing the load on the output shaft in dependence on time, calculating a first or second or higher derivative of the parameter in dependence on time, generating a control signal only when the absolute value of the product of the second derivative and the first derivative of the parameter or the absolute value of the product of the higher derivative and the first derivative of the parameter is greater than or equal to the predetermined threshold value, and changing a rotational speed of the electric tool in response to the control signal.

16. An electric tool comprising:

an output shaft, an electric motor configured to drive the output shaft to rotate, a power supply for supplying power to the electric motor, a sensor for measuring a parameter representing the load on the output shaft, and a control component configured to calculate a first or second or higher derivative of the parameter in dependence on time, and to generate a control signal to change a rotational speed of the electric motor only when the absolute value of the product of the second derivative and the first derivative of the parameter or the absolute value of the product of the higher derivative and the first derivative of the parameter is greater than or equal to the predetermined threshold value.

* * * * *